UNITED STATES PATENT OFFICE.

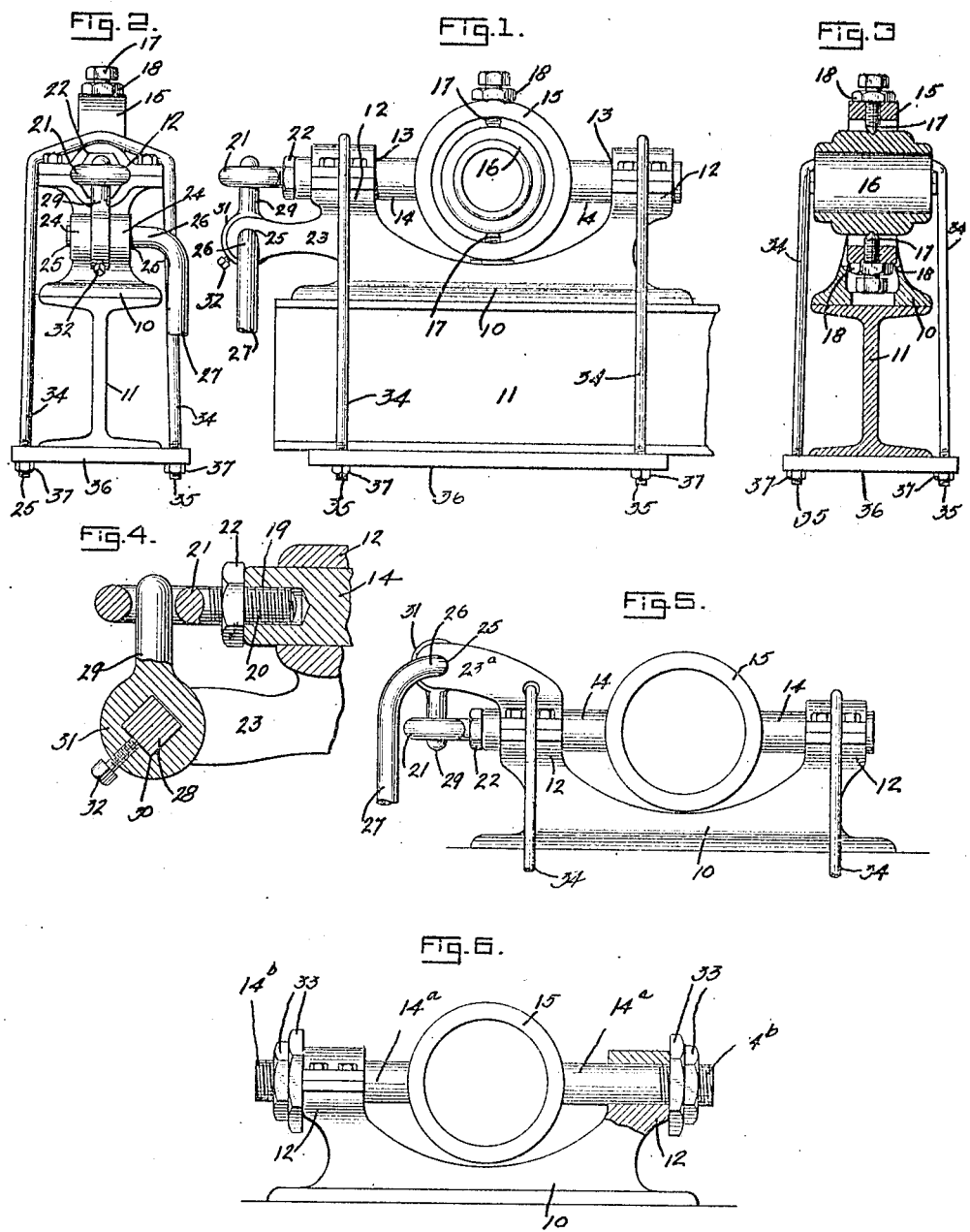
W. C. SOLE.
SHAFT BEARING.
APPLICATION FILED NOV. 12, 1917.
1,292,906.
Patented Jan. 28, 1919.

WILLIAM C. SOLE, OF SULLIVAN, INDIANA.

SHAFT-BEARING.

1,292,906.  Specification of Letters Patent.  Patented Jan. 28, 1919.

Application filed November 12, 1917. Serial No. 201,616.

*To all whom it may concern:*

Be it known that I, WILLIAM C. SOLE, a citizen of the United States, and a resident of Sullivan, in the county of Sullivan and State of Indiana, have invented a new and Improved Shaft-Bearing, of which the following is a full, clear, and exact description.

My invention has for its object to provide a bearing which may be moved as may be desired to adjust a shaft journaled therein. The shaft is journaled in a bearing member pivoted to a ring having studs disposed at an angle to the axis of the pivot, the studs being movable longitudinally in bearings by means provided.

Additional objects of the invention will appear in the following specification, in which the preferred form is described.

In the drawings, similar reference characters refer to similar parts in all the views, in which—

Figure 1 is a side elevation of my bearing,

Fig. 2 is an end view of Fig. 1,

Fig. 3 is a transverse sectional view of Fig. 1,

Fig. 4 is an enlarged fragmentary sectional view illustrating the lever arm which moves the studs longitudinally in their bearings, Fig. 5 is a modified form of the invention, and Fig. 6 is another modified form of the invention.

By referring to the drawings, it will be seen that my shaft bearing is provided with a base 10, which, as shown in the drawings, may be disposed on an eye beam 11. The base 10 has two upwardly extending arms 12, with bearings 13 in alinement with each other; there being disposed for longitudinal movement in the said bearings 13, studs 14 which extend from opposite sides of a ring 15. Disposed in this ring 15, there is a bearing member 16 which is held in position in the ring 15 by screws or pivots 17, the axes of these pivots 17 being preferably at right angles to the axis of the studs 14. It will, therefore, be seen that when the studs 14 are moved to the right or to the left, it is possible for the bearing member 16 to move on the pivot formed by the screws or pivots 17. The screws 17 are held in adjusted position by lock nuts 18.

As will be seen by referring to Fig. 4 of the drawings, there is a threaded orifice 19 in the outer end of one of the studs 14, and a screw 20 of a screw-eye 21 meshes in the said threaded orifice 19, a lock nut 22 being provided for holding the screw 20 in place. Extending at one end of the base 10, there is an arm 23 having bifurcated ends 24, in which there are bearings 25; the bent end 26 of an arm 27 being journaled in the said bearings 25 and being preferably provided with an angular portion 28 which is normally disposed between the bearings 24. An arm 29 is provided having an angular opening 30 in which the said portion 28 of the bent end 26 of the arm 27 is disposed, the base 31 of the arm 29 fitting the opening between the bearings 24. A set screw 32 is preferably provided for locking the base 31 of the arm 29 to the said angular portion 28 of the arm 27. The arm 29 is disposed in the eye 21, and it will be understood that by a movement of the arm 27, the arm 29 will be moved to shift the studs 14, the ring 15 and the bearing member 16.

In the modified form of the invention illustrated in Fig. 5 of the drawings, an arm 23$^a$ extends laterally above the eye 21, instead of below the eye, as shown at 23 in Figs. 1, 2 and 4 of the drawings. In other respects the construction illustrated in Fig. 5 corresponds with the construction illustrated in Figs. 1, 2, 3 and 4.

In the construction illustrated in Fig. 6, the studs 14$^a$ have threaded outer ends 14$^b$ and lock nuts 33 are provided which lock against the bearings 12 and prevent lateral movement of the studs 14$^a$ after adjustment.

As will be seen by referring to Figs. 1, 2, 3 and 5, tie members 34 may be disposed around the bearings 12, these tie members having threaded terminals 35 which extend through orifices in plate 36. Nuts 37 are provided which mesh with the threaded terminals 35 and abut against the plate 36. The said plate 36 is disposed at the under side of the eye bolt as illustrated in the drawings.

Having thus described my invention, what I claim as new and desire to secure by Letters Patent is:

1. In a shaft bearing, a bearing, a ring having an extending stud movable longitudinally in the bearing, and a bearing member pivoted in the ring on an axis at an angle to the stud.

2. In a shaft bearing, a bearing, a ring having an extending stud with an eye, the stud being movable longitudinally in the bearing, a bearing member pivoted in the ring on an axis at an angle to the stud, and an operating member extending into the eye.

3. In a shaft bearing, a bearing, a ring having an extending stud with an eye, the stud being disposed in the bearing for longitudinal movement therein, a bearing member pivoted in the ring on an axis at an angle to the stud, and a lever having an arm disposed in the eye.

4. In a shaft bearing, a base having two bearings, a ring having an extending stud with an eye, the stud being disposed in one of the bearings for longitudinal movement therein, a bearing member pivoted in the ring on an axis at an angle to the stud, and a lever fulcrumed in the other bearing and having an arm disposed in the eye.

5. In a shaft bearing, a base having two bearings, a ring having an extending stud disposed in one of the bearings for longitudinal movement, a bearing member pivoted in the ring on an axis at an angle to the stud, and a lever fulcrumed in the other bearing and having an arm operatively engaging the stud.

6. In a shaft bearing, a base having two bearings in alinement, a ring having extending studs disposed in the bearings for longitudinal movement therein, a bearing member pivoted in the ring on an axis at an angle to the studs, and means to control the longitudinal movement of the studs.

7. In a bearing, a base having two bearings in alinement and a third bearing, a ring having extending studs disposed for longitudinal movement in the two bearings in alinement, a bearing member pivoted in the ring on an axis at an angle to the studs, an arm having a bent end journaled in said third bearing, and an arm secured to the said bent end of the first arm and operatively engaging one of the studs.

8. In a shaft bearing, an open member, guide means for the member, and a bearing pivoted in the member.

WILLIAM C. SOLE.

Copies of this patent may be obtained for five cents each, by addressing the "Commissioner of Patents, Washington, D. C."